US011442194B2

(12) United States Patent
Cole (10) Patent No.: US 11,442,194 B2
(45) Date of Patent: Sep. 13, 2022

(54) SYSTEM FOR LOCATING A UTILITY WITH A DOWNHOLE BEACON

(71) Applicant: The Charles Machine Works, Inc., Perry, OK (US)

(72) Inventor: Scott B. Cole, Edmond, OK (US)

(73) Assignee: The Charles Machine Works, Inc., Perry, OK (US)

( * ) Notice: Subject to any disclaimer, the term of this patent is extended or adjusted under 35 U.S.C. 154(b) by 690 days.

(21) Appl. No.: 15/952,905

(22) Filed: Apr. 13, 2018

(65) Prior Publication Data

US 2018/0299575 A1 Oct. 18, 2018

Related U.S. Application Data

(60) Provisional application No. 62/485,446, filed on Apr. 14, 2017.

(51) Int. Cl.
| | |
|---|---|
| *G01V 3/08* | (2006.01) |
| *E21B 7/04* | (2006.01) |
| *G01V 3/26* | (2006.01) |
| *E21B 47/13* | (2012.01) |
| *E21B 47/092* | (2012.01) |
| *E21B 7/02* | (2006.01) |

(52) U.S. Cl.
CPC .............. *G01V 3/081* (2013.01); *E21B 7/04* (2013.01); *E21B 7/046* (2013.01); *E21B 47/092* (2020.05); *E21B 47/13* (2020.05); *G01V 3/26* (2013.01); *E21B 7/02* (2013.01)

(58) Field of Classification Search
CPC ........ E21B 47/09; E21B 7/04; E21B 47/0905; E21B 47/122; E21B 7/046; E21B 7/02; G01V 3/08; G01V 3/081; G01V 3/26; G01V 11/002; G01V 13/00; G01V 3/00; G01V 3/15; H01Q 7/08; H01Q 1/12
USPC ......................................... 324/326
See application file for complete search history.

(56) References Cited

U.S. PATENT DOCUMENTS

| | | | | |
|---|---|---|---|---|
| 3,311,849 A | * | 3/1967 | Bosma | ................... H01P 1/383 333/1.1 |
| 4,345,106 A | | 8/1982 | Canfield et al. | |

(Continued)

FOREIGN PATENT DOCUMENTS

EP 0783190 A1 * 7/1997 ............... H01Q 7/00

OTHER PUBLICATIONS

Development of the Intelligent Horizontal Directional Drilling systems (Year: 2016).*

(Continued)

*Primary Examiner* — Jermele M Hollington
*Assistant Examiner* — Courtney G McDonnough
(74) *Attorney, Agent, or Firm* — Tomlinson McKinstry, P.C.

(57) ABSTRACT

A system for locating an underground utility line using a beacon positioned within a downhole tool. The beacon comprises a magnetic sensor formed from one or more ferrite rods. The rods are arranged such that no rod is orthogonal to the longitudinal axis of the beacon housing. The magnetic sensor detects the presence of an underground utility line and sends a signal to an above-ground tracker indicating that a line has been detected. An above-ground locator may be used to determine the position of the line relative the beacon, so that the downhole tool may be steered away from the line.

27 Claims, 10 Drawing Sheets

(56) References Cited

U.S. PATENT DOCUMENTS

| | | | |
|---|---|---|---|
| 4,875,292 A * | 10/1989 | Gibson | E21B 7/068 |
| | | | 33/304 |
| 5,231,355 A | 7/1993 | Rider et al. | |
| 5,834,936 A * | 11/1998 | Taicher | G01N 24/081 |
| | | | 324/303 |
| 5,872,703 A | 2/1999 | Williams et al. | |
| 5,878,825 A | 3/1999 | Okuyama et al. | |
| 5,905,458 A | 5/1999 | Ashihara | |
| 5,907,242 A * | 5/1999 | Gard | H03H 7/427 |
| | | | 324/326 |
| 6,079,269 A | 6/2000 | Dilz, Jr. | |
| 6,308,787 B1 | 10/2001 | Alft | |
| 6,313,755 B1 | 11/2001 | Hetmaniak et al. | |
| 7,786,731 B2 | 8/2010 | Cole et al. | |
| 8,788,746 B2 | 7/2014 | Matsushima et al. | |
| 8,957,683 B2 | 2/2015 | Bittar | |
| 2004/0140809 A1 * | 7/2004 | Mercer | E21B 47/02216 |
| | | | 324/326 |
| 2005/0023036 A1 * | 2/2005 | Cole | E21B 47/024 |
| | | | 175/26 |
| 2005/0189143 A1 * | 9/2005 | Cole | E21B 47/0232 |
| | | | 175/26 |
| 2005/0249503 A1 | 11/2005 | Sun | |
| 2006/0039221 A1 | 2/2006 | Fukuda | |
| 2006/0244454 A1 * | 11/2006 | Gard | E21B 47/092 |
| | | | 324/326 |
| 2009/0167589 A1 | 7/2009 | Bausov | |
| 2009/0183917 A1 | 7/2009 | Sharp et al. | |
| 2010/0012377 A1 | 1/2010 | Sharp et al. | |
| 2011/0261649 A1 | 10/2011 | Wallbom | |
| 2012/0212221 A1 * | 8/2012 | Cole | G01V 3/081 |
| | | | 324/258 |
| 2013/0066556 A1 | 3/2013 | Bucker | |
| 2013/0184995 A1 | 7/2013 | Sinclair | |
| 2013/0260705 A1 | 10/2013 | Stratford | |
| 2014/0022088 A1 | 1/2014 | Chau et al. | |
| 2014/0125509 A1 | 5/2014 | Stolarczyk et al. | |
| 2014/0218225 A1 | 8/2014 | Simicevic et al. | |
| 2015/0323696 A1 * | 11/2015 | Cole | H01Q 1/12 |
| | | | 324/326 |
| 2016/0069180 A1 * | 3/2016 | Zeller | G01S 11/06 |
| | | | 340/854.4 |
| 2016/0160633 A1 * | 6/2016 | Rodney | E21B 47/02216 |
| | | | 340/854.1 |
| 2016/0265347 A1 | 9/2016 | Gunsaulis et al. | |
| 2017/0089140 A1 * | 3/2017 | Shaw | G01V 3/15 |

OTHER PUBLICATIONS

Kothari, K.M., Pittard, G.T., and Cribbs, R., "Obstacle Detection System for Utility Construction Operations", article, 2003, 8 pages.

Nakauchi, T., Hayakawa, H., and Arai, I., "A Small GPR for Horizontal Directional Drilling System", article, 2006, 4 pages, Kigam, Korea.

Nakauchi, T., Arai, I., and Hayakawa, H., "A Small Prospecting Radar System", article, 2000, 4 pages, Gold Coast, Queensland, Australia.

Jaganathan, A., Shah, J.N., Allouche, E.N., Kieba, M., and Ziolkowski, C.J., "Modeling of an obstacle detection sensor for horizontal directional drilling (HDD) operations", article, 2011, 8 pages, Ruston, LA.

Manacorda, G., Koch, E., Scott, H.F., and Pinchbeck, D., "The Orfeus Project: Design of a Bore-head GPR for Horizontal Directional Drilling (HDD) Equipment", Paper, 2009, 9 pages, B-1-04, Toronto, ON, Canada.

Nakauchi, T., Nakajima, H., Lizuka, K. Watanabe, T., and Arai, T., "Development of the Intelligent Horizontal Directional Drilling Systems", article, 18 pages; in the public domain at least as early as Nov. 28, 2016.

* cited by examiner

SYSTEM FOR LOCATING A UTILITY WITH A DOWNHOLE BEACON

SUMMARY

The present invention is directed to a system comprising a borehole, a drill string situated in the borehole, a downhole device carried by the drill string, and an above-ground tracker configured to receive data from the downhole device. The downhole device comprises a housing having a longitudinal axis, a magnetic dipole source positioned within the housing, and a magnetic field sensor formed from two or more ferrite rods. The ferrite rods are arranged such that no rod is orthogonal to the longitudinal axis of the housing.

The present invention is also directed to a system comprising a borehole, a drill string situated in the borehole, a downhole device carried by the drill string, and an above-ground tracker configured to receive data from the downhole device. The downhole device comprises a housing, a magnetic dipole source positioned within the housing, and a magnetic field sensor positioned within the housing and comprising two and only two ferrite rods.

DETAILED DESCRIPTION

Figure 1:
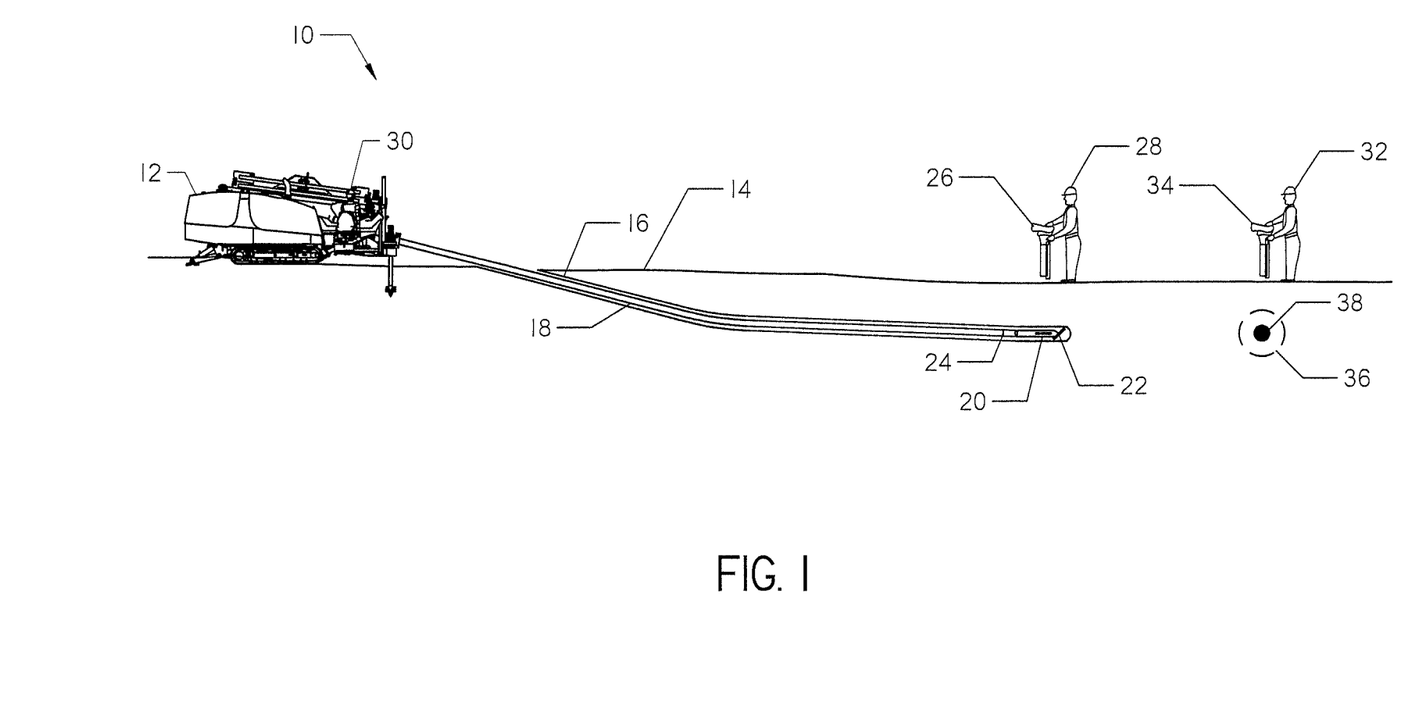
FIG. 1 is an illustration of a horizontal directional drilling system for drilling a borehole and a tracking and locating system for use with the present invention.
Figure 2A:
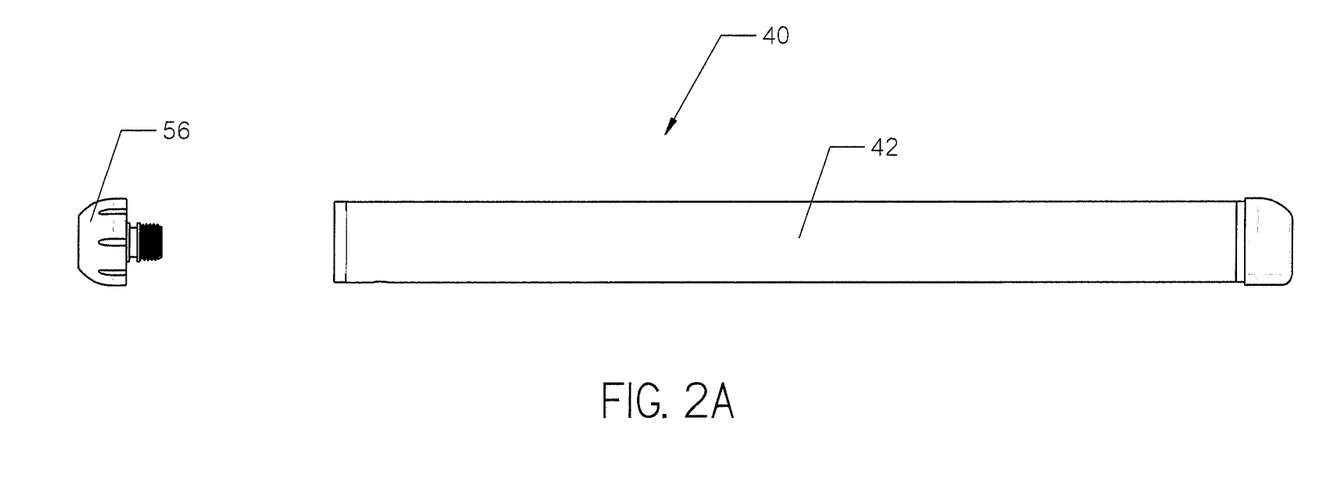
FIG. 2A is a side view of a beacon for use with the present invention. An end cap is shown exploded from the beacon for better display.
Figure 2B:
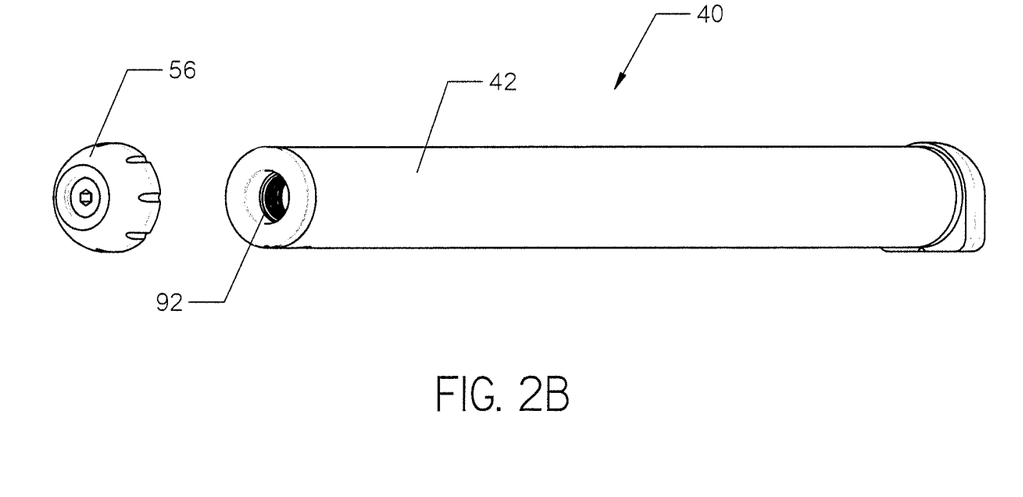
FIG. 2B is a perspective view of the beacon of FIG. 2A. The end cap is shown exploded from the beacon for better display.

With reference to FIG. 1, a conventional horizontal directional drilling system 10 is shown. A drilling rig 12 is shown positioned on a ground surface 14. The drilling rig 12 drills a borehole 16 by steering a drill string 18 through the ground. A downhole tool 20 having a drill bit 22 attached to its front end is connected to a first end 24 of the drill string 18. The downhole tool 20 may house a downhole device such as a beacon.

The beacon transmits a low frequency dipole magnetic field. The magnetic field may be detected at the ground surface 14 by an above-ground tracker 26 operated by a tracking operator 28. The tracker 26 analyzes the magnetic field emitted from the beacon to determine the position of the beacon below ground. The tracker 26 transmits the beacon's position to a drill operator 30 positioned at the drill rig 12. Tracking tools and methods are described in U.S. Pat. No. 7,786,731 issued to Cole et al., the contents of which are incorporated herein by reference.

Continuing with FIG. 1, before starting drilling operations, a locating operator 32 may walk the ground surface 14 above the intended borepath and look for any below ground utility lines using an above-ground locator 34. The locator 34 detects a magnetic field 36 emitted from a below ground utility line 38. In a passive locating operation, the underground utility is an energized power line, which is already carrying a current. In an active locating operation, a utility line that does not normally carry a current, such as a pipe, may be energized so its position may be located. For example, the line may be energized by feeding tracer wire through the line and energizing the tracer wire. The locator 34 determines the location of the utility line 38 by analyzing the detected magnetic field emitted from the energized line. The locating operator 32 conveys the information detected by the locator 34 to the drilling operator 30 so that buried utility lines may be avoided during drilling operations.

While it is common to locate lines from above-ground, it is desirable to be able to locate a line from below ground as well. Locating utility lines from below ground may help reduce the risk of the drill bit 22 accidently colliding with underground lines. The present invention is directed to a system for locating an underground utility or object using a beacon positioned within the downhole tool.

With reference to FIGS. 2A-4B, a beacon 40 for use with the present invention is shown. The beacon 40 has a tubular housing 42 formed from a non-conductive material, such as plastic. A magnetic dipole source or transmitter 44, a magnetic field sensor 46, a battery 48, a processor 50, and electrical circuitry 52 are positioned within the beacon housing 42. The processor 50 is best shown in FIG. 4A.

Figure 4A:
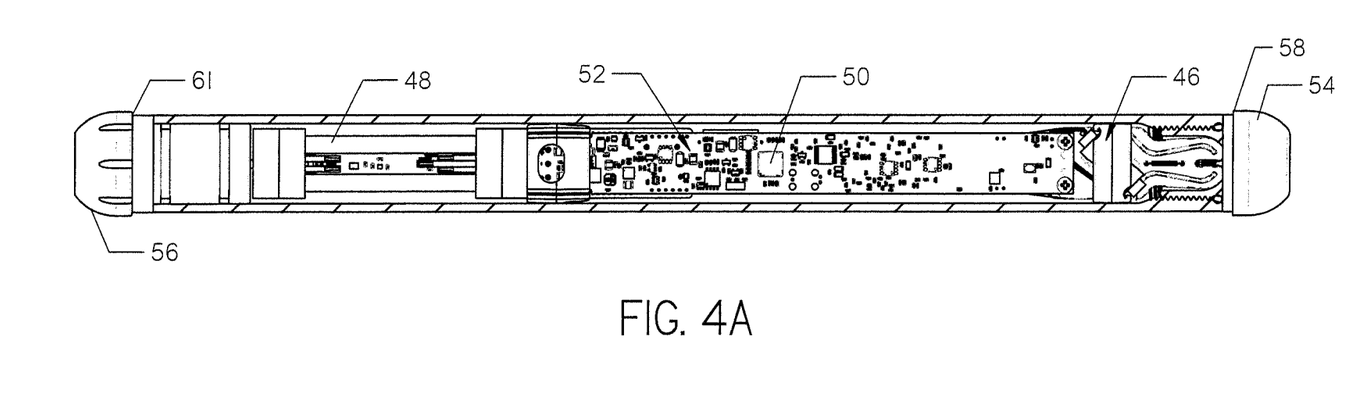
FIG. 4A is a cross-sectional view of a bottom of the beacon of FIG. 2A.
Figure 4B:
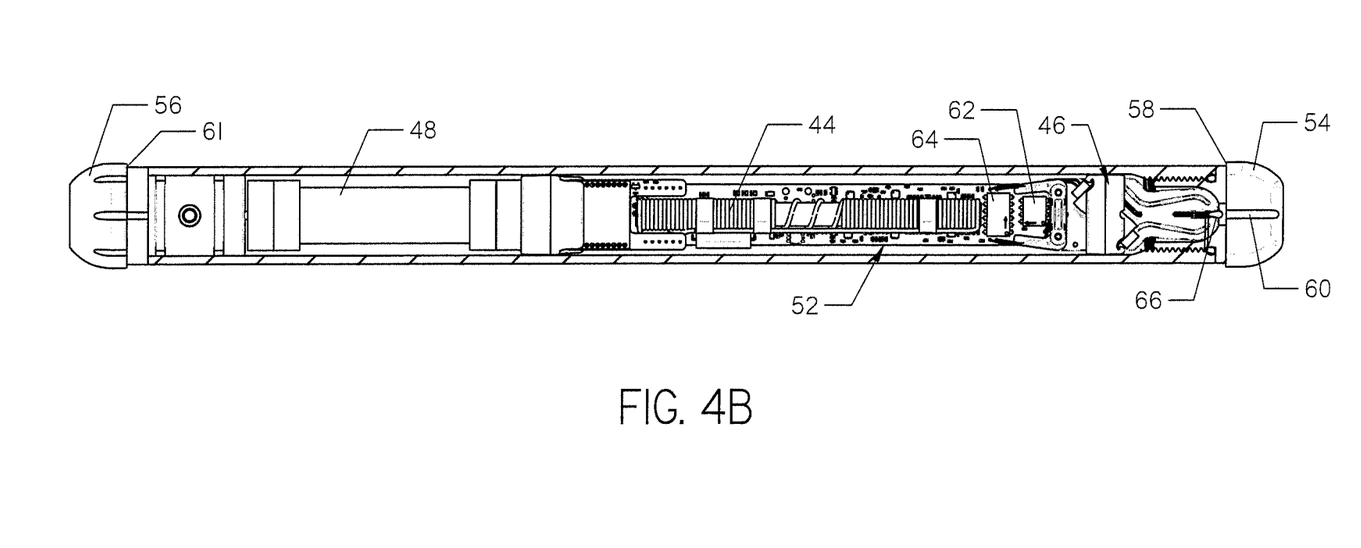
FIG. 4B is a cross-sectional view of a top of the beacon of FIG. 2A.

The housing 42 is sealed closed by a first and second end cap 54 and 56. The first end cap 54 is positioned on a front end 58 of the beacon 40 and has a slot 60 formed in its side, as shown in FIG. 4B. The slot 60 fits on a key (not shown) formed in the downhole tool 20 and helps hold the beacon 40 in place within the tool. The beacon 40 may be positioned within the downhole tool 20 such that the first end cap 54 is closest to the drill bit 22.

The magnetic field sensor 46 is configured to detect magnetic fields emitted from underground utility lines. The magnetic field sensor 46 is preferably positioned proximate the front end 58 of the beacon 40 so that it is close to the drill bit 22. This positioning helps the sensor 46 detect magnetic fields emitted from underground lines before the drill bit 22 contacts the line.

The battery 48 is preferably positioned proximate a rear end 61 of the beacon 40, as shown in FIGS. 3A-4B. This positioning provides more convenient access to the battery 48 during operation. The battery 48 provides power to the beacon 40 during operation. The second end cap 56 may be removed from the beacon 40 to expose a charger connection point 92 for the battery 48, as shown in FIG. 1B. The battery 28 is rechargeable and may be charged without removing the battery from the beacon housing 42.

The transmitter 44, processor 50, and electrical circuitry 52 are preferably positioned between the battery 48 and the sensor 46, as shown in FIGS. 3A-4B. The processor 50 and electric circuitry 52 may be positioned behind the transmitter 44.

The beacon 40 also includes a pitch sensor 62, a roll sensor 64, and a temperature sensor 66, as shown in FIG. 4B. These sensors 62, 64, 66 may communicate via the processor 50 and electrical circuitry 52 with the transmitter 44. The transmitter 44 may comprise a solenoid driver circuit, a transmitter solenoid, and an antenna feedback circuitry as described in U.S. Pat. No. 5,872,703, issued to Williams et al., the contents of which are incorporated herein by reference.

The transmitter 44 is configured to emit a signal that communicates information detected by the pitch, roll, and temperature sensors 62, 64, 66 to the above-ground tracker 26. The transmitter 44 may also communicate the battery life and any information from additional sensors included in the beacon 40 to the tracker 26. The transmitter 44 may be configured to transmit at a frequency of 29 kilohertz.

Figure 5:
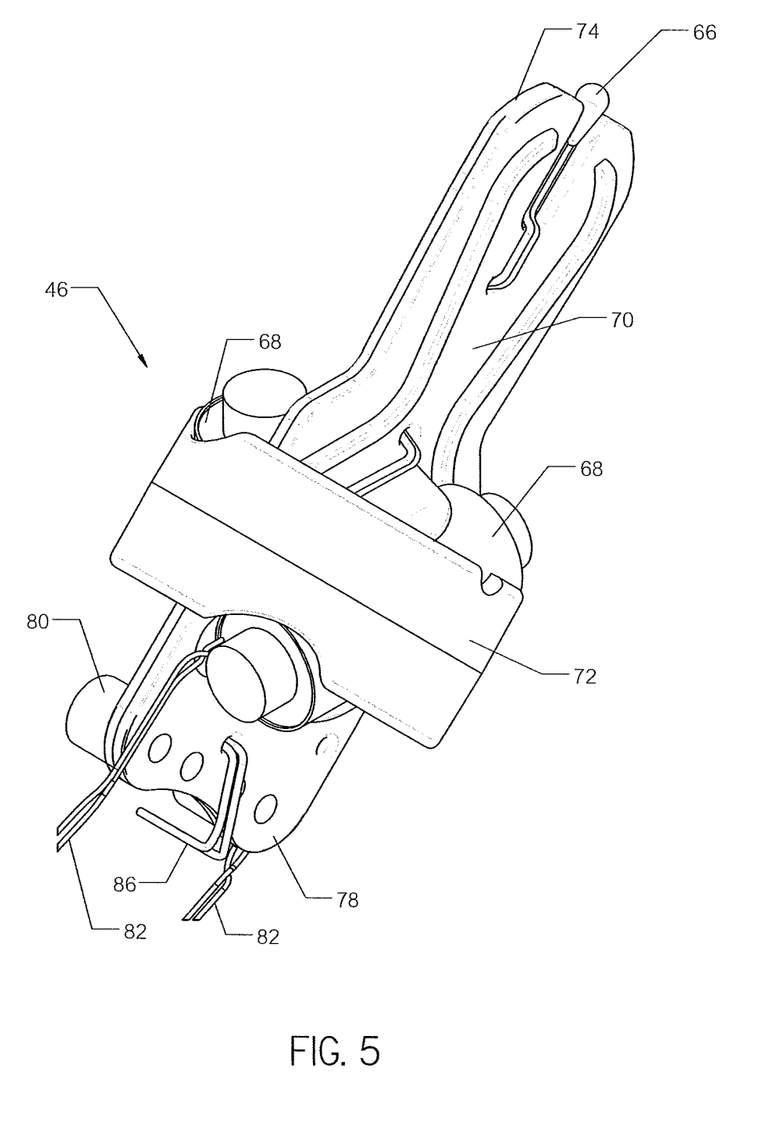
FIG. 5 is a perspective view of a first side of a magnetic field sensor for use with the beacon of FIG. 2A.
Figure 6:
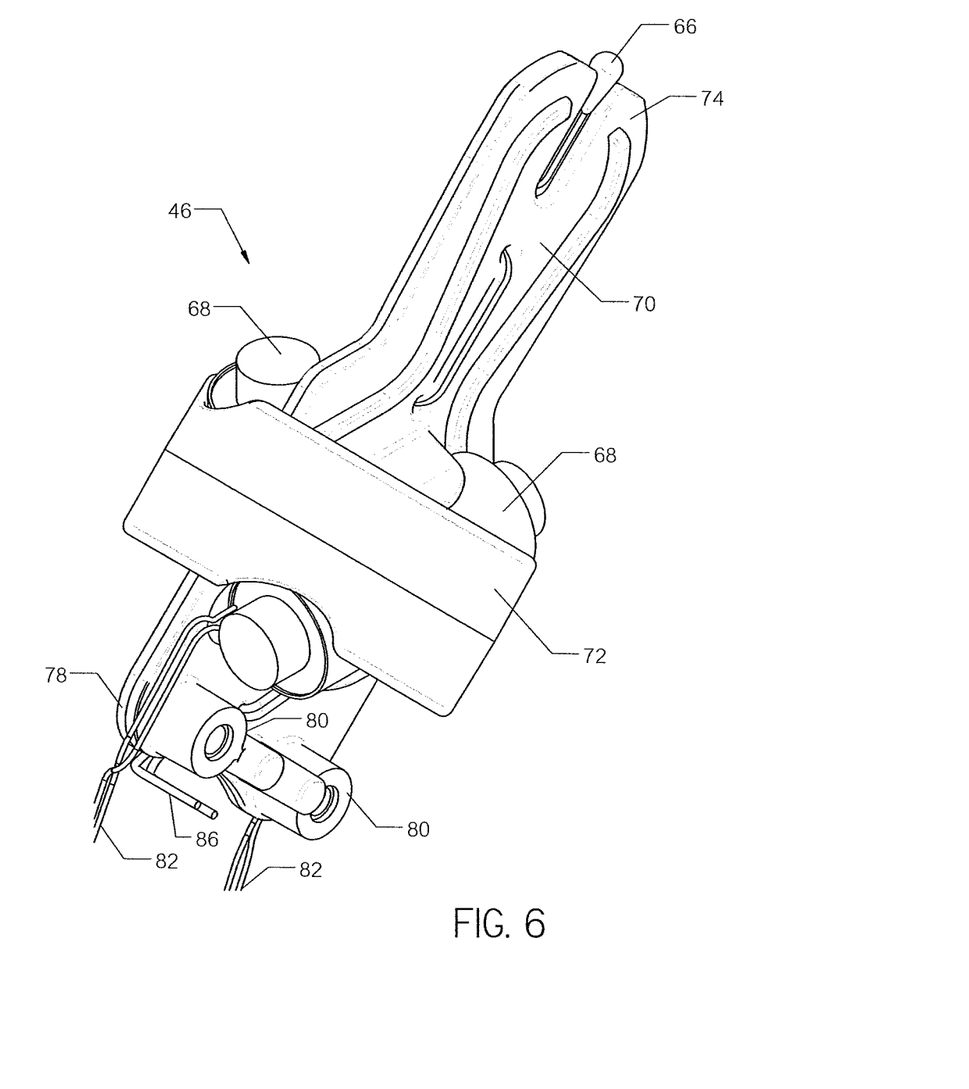
FIG. 6 is a perspective view of a second side of the magnetic field sensor of FIG. 5.
Figure 7:
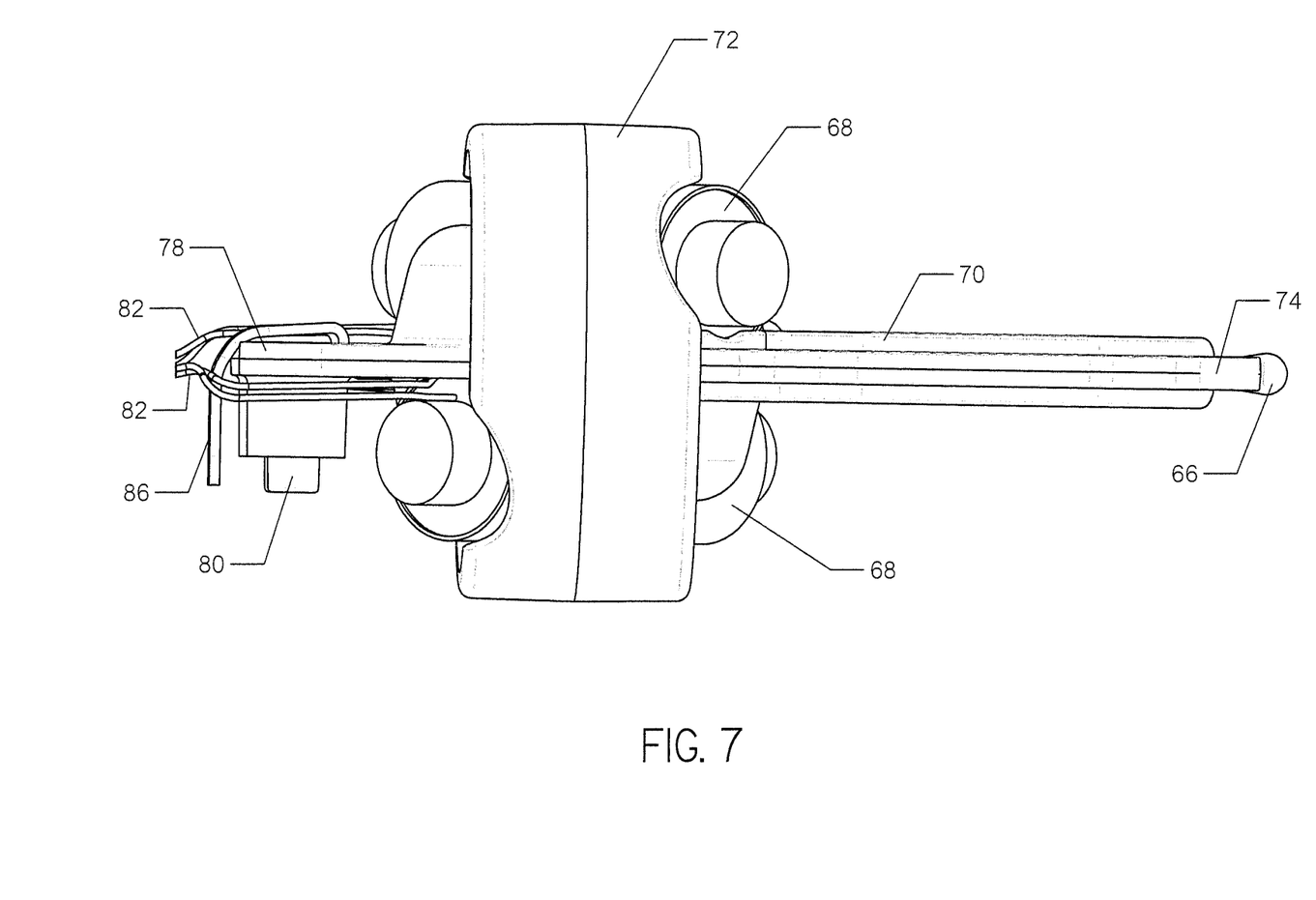
FIG. 7 is a side view of the magnetic field sensor of FIG. 5.

With reference to FIGS. 5-7, the magnetic field sensor 46 is shown in more detail. The sensor 46 comprises at least two ferrite rods 68. The rods 68 are supported on opposite sides of a rigid plate 70, and held in place by an annular member 72. The plate 70 is preferably made of plastic. The member 72 surrounds the plate 70 at its center, as well as the central portions of the rods 68. The rods 68 are situated in an orthogonal relationship to one another. At their ends, the rods 68 extend outside the profile of the member 72.

The plate 70 is an elongate member having opposed ends 74 and 78. The annular member 72 surrounds a medial portion of the plate 70. The first end 74 of the plate 70 supports the temperature sensor 66. When the sensor 46 is installed in the beacon 40, the temperature sensor 66 is positioned immediately adjacent the first end cap 54, as shown in FIG. 4B. Installing the sensor 46 in this manner places the temperature sensor 66 close to the drill bit 22. The drill bit 22 is typically the hottest area of the drilling system 10 during operation. Should the sensor 66 detect a temperature high enough to produce damage to the beacon 40, operation of the drilling system 10 may need to be halted.

Figure 3A:
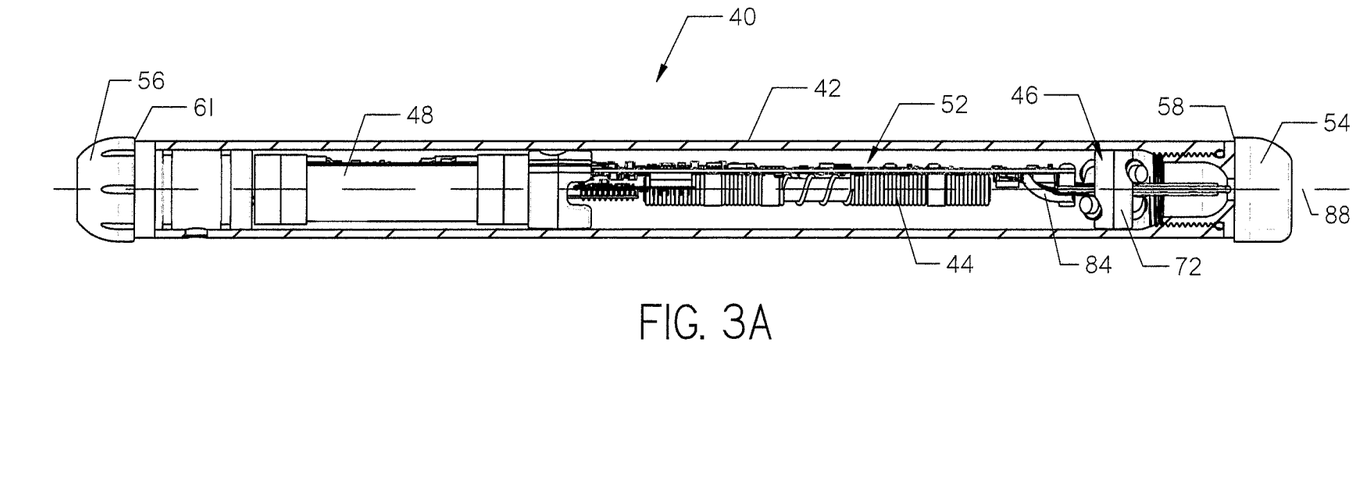
FIG. 3A is a cross-sectional view of a first side of the beacon shown in FIG. 2A.
Figure 3B:
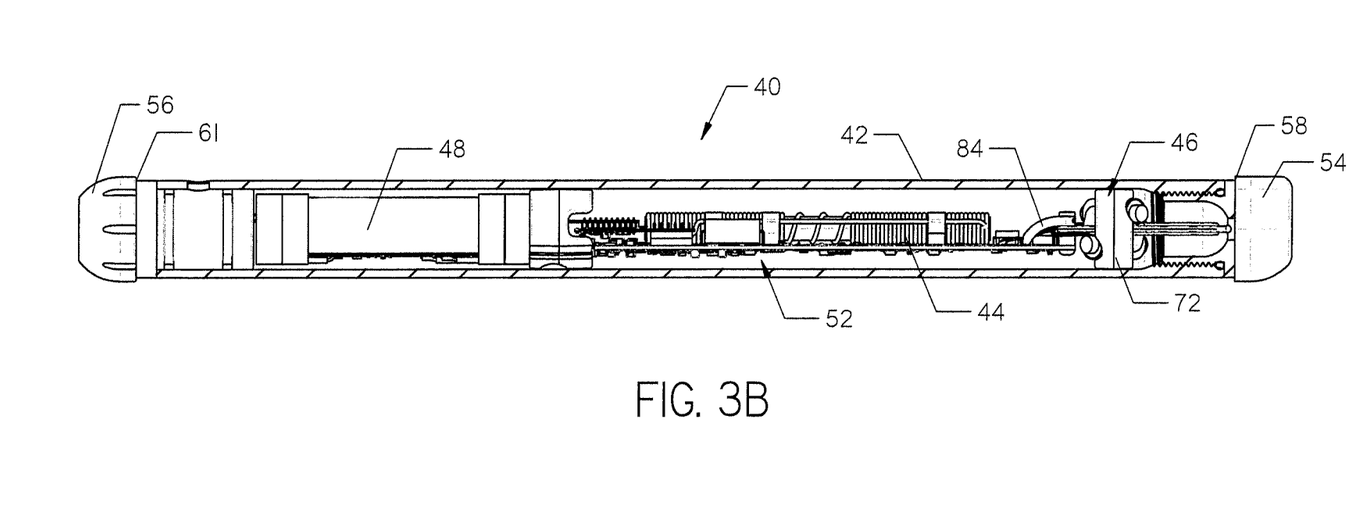
FIG. 3B is a cross-sectional view of a second side of the beacon of FIG. 2A.

The transmitter 44 is attached to the plate 70, adjacent the second end 78, using a set of pegs 80. The rods 68 communicate with the transmitter 44 via a plurality of wires 82. The wires 82 are protected by a set of ramps 84 that extend between the plate 70 and the transmitter 44, as shown in FIGS. 3A-3B. The temperature sensor 66 is connected to the transmitter 44 via a set of wires 86 that extend past the second end 78 of the plate 70.

Turning back to FIGS. 3A and 3B, the annular member 72 holds the sensor 46 in position within the housing 42. The sides of the member 72 engage the internal walls of the housing 42. The plate 70 and member 72 cooperate to maintain each rod in a non-orthogonal position relative to a longitudinal axis 88 of the beacon 40, as shown in FIG. 3A. Because none of the rods 68 is orthogonal to the longitudinal axis 88 of the beacon 40, the rods 68 may have a greater length than might otherwise be possible. Longer ferrite rods enhance the sensitivity of the sensor 46.

Because the sensor 46 has only two rods 68 it is capable of detecting the magnitude of the field emitted from the utility line 38 in two dimensions at any given moment. Each rod 68 detects a different component or different axis of the field. The beacon 40 and its sensor 46 rotate around the longitudinal axis 88 as the drill string 18 rotates during the drilling process. When the beacon 40 is rotated, the sensor 46 produces a series of two-dimensional field measurements at different increments as it rotates. As a result of the measurements taken during sensor rotation, the field along a third component or axis can be calculated.

In traditional locating operations, the locator 34 comprises two spaced-apart sensors. The location of the underground utility line is determined by comparing the measurements detected by the first and second sensors. In contrast, the beacon 40 only has one sensor 46 rather than two. One and only one sensor 46 may be desirable because of the resultant decrease in the length of the beacon 40. On the other hand, a single sensor 46 cannot map a utility line 38 in three dimensions. Using a single sensor 46, the beacon 40 can only detect that a utility line 38 is nearby, and signal an above-ground tracker 26. Even though the precise location of the utility line 38 may not yet be known, the drilling operation may be halted in response to such a signal.

When a potential utility line is detected, the above-ground locator 34 may be brought in to re-locate the utilities near the intended borepath. The locator 34 determines the location of the line 38 and communicates the line location to a tracker 26. Using the information from the locator 34 and the beacon 40, the tracker 26 calculates the location of the line 38 underground with respect to the beacon. If the tracker 26 calculates a distance that is below a predetermined limit, the tracker may be configured to send a control signal to the drilling rig 12 to shut down the boring operation, if it has not been halted already. The drilling rig operator 28 uses the information calculated by the tracker 26 to steer the downhole tool 20 away from the utility line 38.

The beacon 40 need not be configured to respond to a single predetermined frequency. It may also be configured to scan a range of frequencies, preferably from around 60 hertz to around 3.5 kilohertz. Scanning across a range of frequencies allows the system to detect a wider range of obstacles, including previously unknown sources, as well as those already known. The unknown sources may include power lines or other utilities, such as pipes re-radiating local noise signals.

In one embodiment, the beacon 40 may be configured to transmit a shutdown signal whenever the sensor 46 reports a magnetic field exceeding a predetermined magnitude. A field of such strength may indicate the presence of a nearby underground power line. The drilling rig 12 may be configured to shut down automatically in response to such a signal.

The transmitting frequency range of the transmitter 44 and the receiving frequency range of the sensor 46 are sufficiently distant to allow the sensor's receiving system to filter out the beacon's transmitted signal using systems such as analog filters and DSP filtering.

Figure 8A:
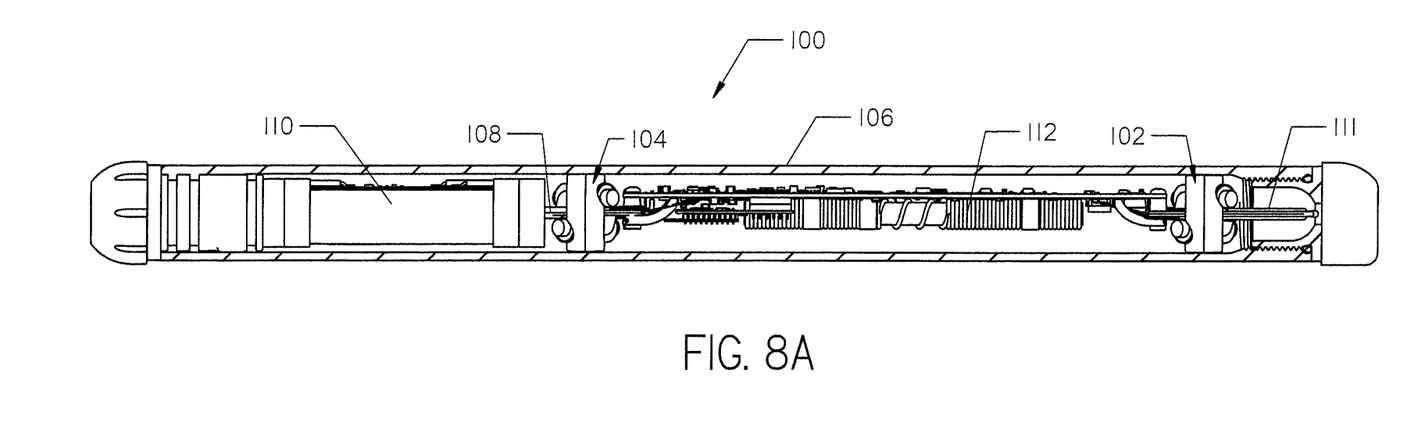
FIG. 8A is a cross-sectional view of a first side of a first alternative embodiment of a beacon for use with the present invention.
Figure 8B:
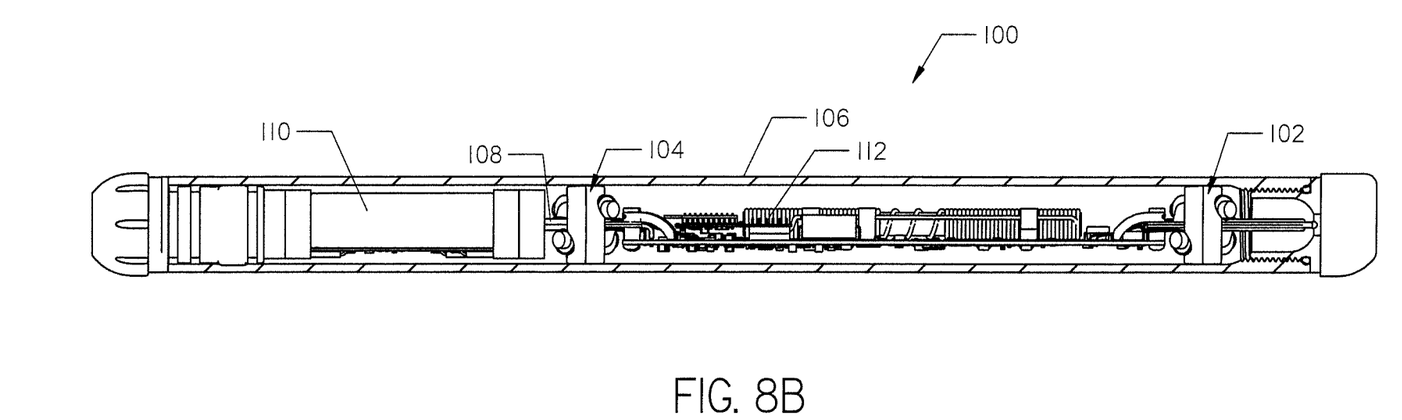
FIG. 8B is a cross-sectional view of a second side of the beacon of FIG. 8A.

With reference to FIGS. 8A and 8B, a first alternative embodiment of the beacon 100 is shown. The beacon 100 is identical to beacon 40, except that two spaced-apart sensors 102 and 104 are installed within the beacon housing 106, rather than a single such sensor. The first sensor 102 is configured and positioned within the beacon housing 106 in the same manner as the sensor 46. The second sensor 104 is configured identically to the first sensor 102 but does not include a temperature sensor. The plate 108 of the second sensor 102 can thus be shorter than the plate in of the first sensor 106. The second sensor 104 is positioned between a battery 110 and a transmitter 112.

The sensors 102, 104 detect the components of the magnetic field emitted from the utility line 38 in the same manner as sensor 46. Because the beacon 100 has two sensors 102, 104 the beacon's processor can compare the measurements detected by each sensor to determine the location of the utility line relative the beacon 100. The processor calculates the location of the line by finding the radial and tangential components of the magnetic field detected by each sensor 102, 104. Once the location of the line is known, the intended borepath can be altered to route the bore around the utility line.

Figure 9:
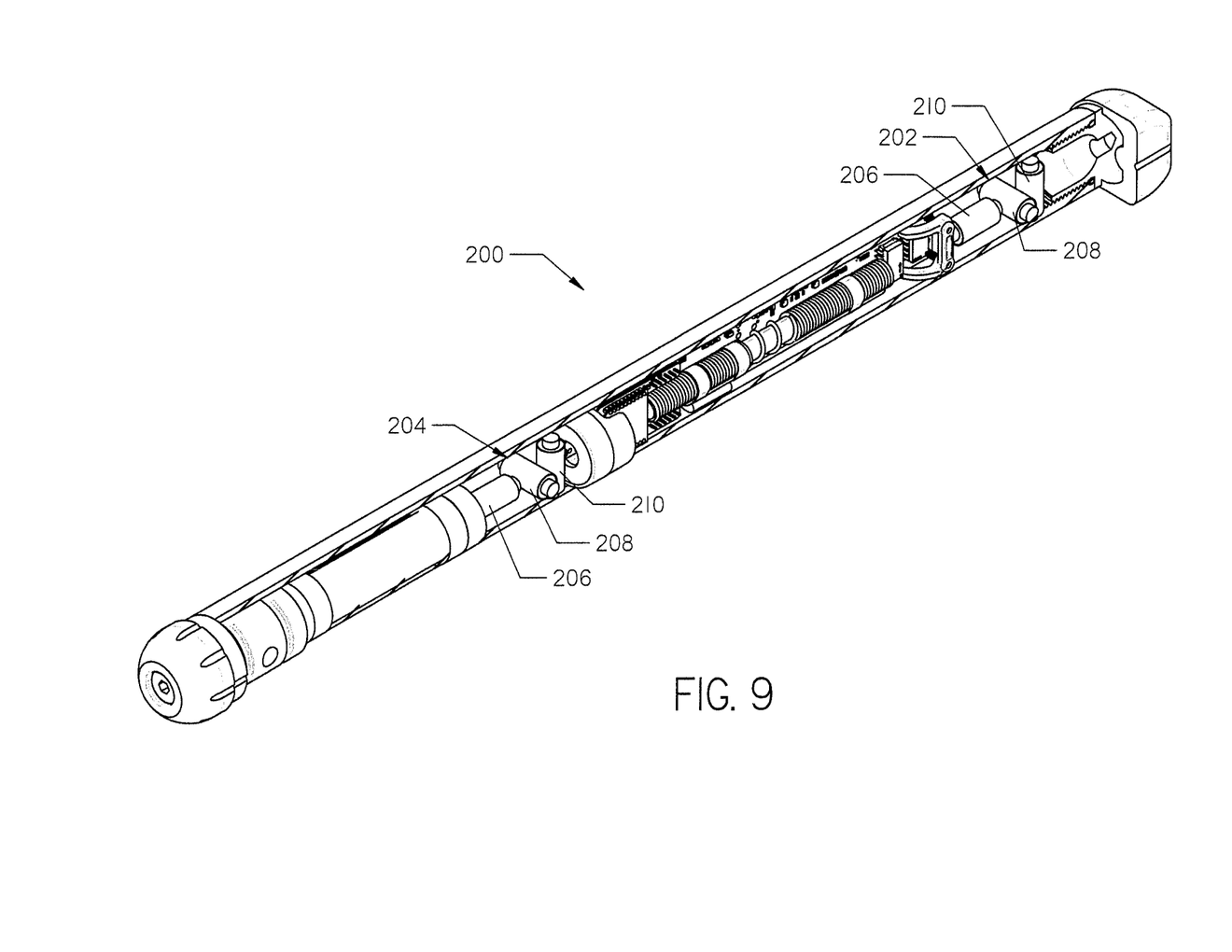
FIG. 9 is a perspective view of a second alternative embodiment of a beacon for use with the present invention. A portion of the beacon housing has been cut away for better display.
Figure 10A:
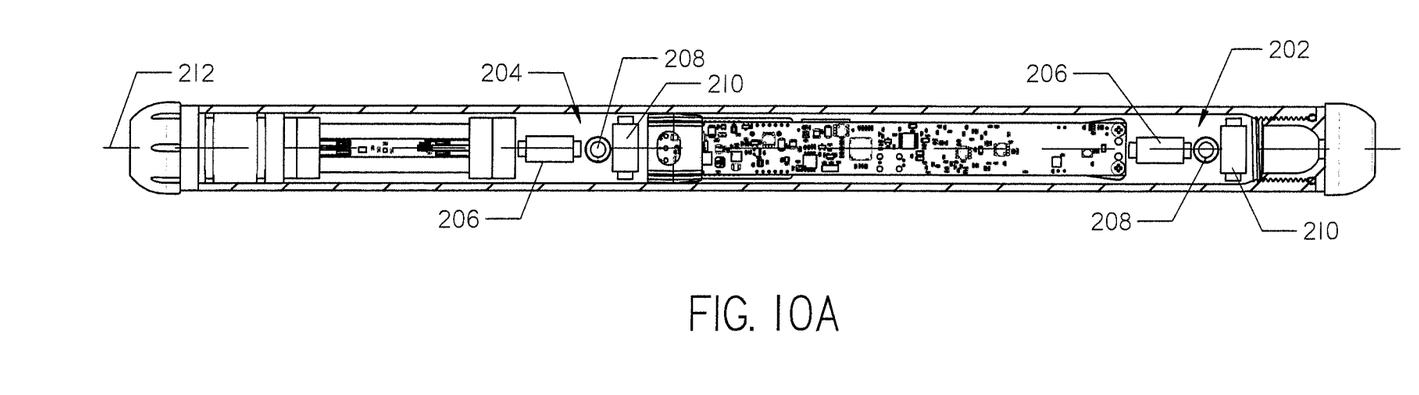
FIG. 10A is a cross-sectional view of a bottom of the beacon of FIG. 9.
Figure 10B:
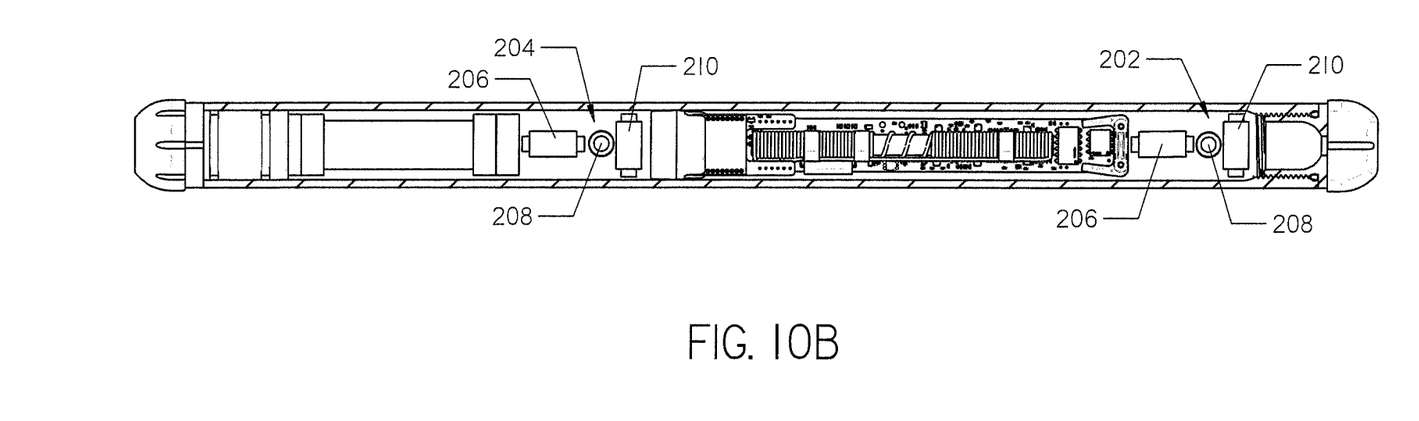
FIG. 10B is a cross-sectional view of a top of the beacon of FIG. 9.

Turning now to FIGS. 9-10B, a second alternative embodiment of the beacon 200 is shown. The beacon 200 is identical to beacon 100 except for the configuration of its magnetic sensors 202 and 204. Each of the sensors 202 and 204 is formed from a plurality of loop antennae, ferrite rods, or fluxgate magnetometers. In the embodiment shown in the Figures, each of the sensors 202 and 204 is formed from three ferrite rods 206, 208, 210.

The first ferrite rod 206 is situated on a longitudinal axis 212 of the beacon 200, as shown in FIG. 10A. The second ferrite rod 208 is disposed in orthogonal relationship to the longitudinal axis 212. The third ferrite rod 210 is disposed in orthogonal relationship to both the longitudinal axis 212 and to the second ferrite rod 208. Use of the three ferrite rods 206, 208, 210 configures each sensor 202, 204 for three-dimensional field detection. Each of the rods 206, 208, 210 detects a different axial component of the same magnetic field.

Each of the sensors 202 and 204 may be configured to detect at least one field frequency between about 60 hertz and about 3.5 kilohertz. More preferably, each sensor is configured to scan a range of such frequencies. Most preferably, each sensor is configured to scan the full range of field frequencies between about 60 hertz and about 3.5 kilohertz.

Changes may be made in the construction, operation and arrangement of the various parts, elements, steps and procedures described herein without departing from the spirit and scope of the invention as described in the following claims.

The invention claimed is:

1. A system, comprising:
   a borehole;
   a drill string situated in the borehole;
   a downhole device carried by the drill string and comprising:
      a housing having a longitudinal axis;
      a magnetic dipole source positioned within the housing;
      a magnetic field sensor formed from two or more ferrite rods arranged such that no rod is orthogonal to the longitudinal axis of the housing; and
      an annular member positioned within the housing, in which the two or more ferrite rods are supported by the annular member; and
   an above-ground tracker configured to receive data from the downhole device.

2. The system of claim 1, the downhole device further comprising a plurality of magnetic field sensors positioned within the housing.

3. The system of claim 1 in which the magnetic field sensor comprises two and only two ferrite rods disposed in orthogonal relationship to each other.

4. The system of claim 1 in which the magnetic field sensor is the only magnetic field sensor within the housing.

5. A method of using the system of claim 1, in which the system further comprises an energized utility line situated underground and emitting a magnetic field, the method comprising:
   using the magnetic field sensor to detect the magnetic field emitted by the energized utility line; and
   transmitting a signal from the downhole device to the above-ground tracker in response to detecting the magnetic field.

6. The method of claim 5, in which the system further comprises an above-ground locator, the method further comprising:
   locating the energized utility line with the above-ground locator;
   locating the downhole device with the above-ground tracker; and
   determining the position of the energized utility line relative to the downhole device.

7. A method of using the system of claim 2, in which the system further comprises an energized utility line situated underground and emitting a magnetic field, the method comprising:
   using each magnetic field sensor to detect a component of the magnetic field emitted by the energized utility line; and
   determining a location of the energized utility line by utilizing data detected by each magnetic field sensor.

8. A method of using the system of claim 1, in which the system further comprises an energized utility line situated underground and emitting a magnetic field, and a drilling rig situated above-ground, the drilling rig engaging the drill string, the method comprising:
   using the magnetic field sensor to detect the magnetic field emitted by the energized utility line;
   comparing the detected magnetic field to a threshold value;
   transmitting a signal from the downhole device to the above-ground tracker if the detected magnetic field exceeds the threshold value; and
   automatically shutting down the drilling rig in response to the signal.

9. A method of using the system of claim 1, in which the system further comprises an underground pipe emitting electromagnetic signals, the method comprising:
   using the magnetic field sensor to detect electromagnetic signals emitted from the underground pipe; and
   transmitting a signal from the downhole device to the above-ground tracker in response to detecting the electromagnetic signals.

10. A method of using the system of claim 3, comprising:
    using the magnetic field sensor to make a first set of magnetic field measurements along two orthogonal axes;
    rotating the drill string such that the housing is rotated by an increment;
    after the rotational increment, using the magnetic field sensor to make a second set of magnetic field measurements along two orthogonal axes; and
    using the two sets of field measurements to calculate the magnetic field along three mutually orthogonal axes.

11. The system of claim 1 in which the magnetic field sensor is configured to scan a range of frequencies.

12. The system of claim 1 in which the frequency range is between about 60 hertz and about 3.5 kilohertz.

13. The system of claim 1, further comprising:
    a plate positioned within the housing and having opposed first and second sides, in which the annular member surrounds the plate, and in which at least one of the two or more ferrite rods is supported on the first side of the plate and at least one of the two or more ferrite rods is supported on the second side of the plate.

14. A method of using a system, the system comprising:
a borehole;
a drill string situated in the borehole;
a downhole device carried by the drill string and comprising:
 a housing having a longitudinal axis;
 a magnetic dipole source positioned within the housing; and
 a magnetic field sensor positioned within the housing and configured to detect a magnetic field along a first axis and a second axis, the first and second axes arranged such that neither axis is orthogonal to the longitudinal axis of the housing; and
an above-ground tracker configured to receive data from the downhole device; the method comprising:
using the magnetic field sensor to make a first set of magnetic field measurements along the first and second axes; in which the first axis is orthogonal to the second axis;
rotating the drill string such that the housing is rotated by an increment;
after the rotational increment, using the magnetic field sensor to make a second set of magnetic field measurements along the first and second axes; and
using the two sets of field measurements to calculate the magnetic field along a third axis, the third axis orthogonal to the first and second axes.

15. The method of claim 14, in which the system further comprises an energized utility line situated underground and emitting a magnetic field, the method further comprising:
using the magnetic field sensor to detect the magnetic field emitted by the energized utility line; and
transmitting a signal from the downhole device to the above-ground tracker in response to detecting the magnetic field.

16. The method of claim 14, in which the system further comprises an above-ground locator, the method further comprising:
locating the energized utility line with the above-ground locator;
locating the downhole device with the above-ground tracker; and
determining the position of the energized utility line relative to the downhole device.

17. The method of claim 14, in which the system further comprises an energized utility line situated underground and emitting a magnetic field, and a drilling rig situated above-ground, the drilling rig engaging the drill string, the method further comprising:
using the magnetic field sensor to detect the magnetic field emitted by the energized utility line;
comparing the detected magnetic field to a threshold value;
transmitting a signal from the downhole device to the above-ground tracker if the detected magnetic field exceeds the threshold value; and
automatically shutting down the drilling rig in response to the signal.

18. The method of claim 14, in which the magnetic field sensor is configured to scan a range of frequencies.

19. The method of claim 14, in which the frequency range is between about 60 hertz and about 3.5 kilohertz.

20. The method of claim 14, in which the housing is rotated about a longitudinal axis of the housing.

21. The method of claim 14, in which the magnetic field sensor comprises:
two and only two ferrite rods; in which one of the rods is situated on the first axis and the other rod is situated on the second axis.

22. The method of claim 21, in which the downhole device further comprises:
a plate positioned within the housing, in which the two and only two ferrite rods are supported on opposite sides of the plate.

23. The method of claim 22, in which the downhole device further comprises:
an annular member positioned within the housing, in which the annular member surrounds the plate, and in which the two and only two ferrite rods are supported by the annular member.

24. The method of claim 21, in which a length of each of the two and only two ferrite rods is greater than an internal diameter of the housing.

25. The method of claim 24, in which the two and only two ferrite rods are disposed in orthogonal relationship to each other.

26. A method of using a system, the system comprising:
a borehole;
a drill string situated in the borehole;
a downhole device carried by the drill string and comprising:
 a housing having a longitudinal axis;
 a magnetic dipole source positioned within the housing; and
 a magnetic field sensor formed from two or more ferrite rods arranged such that no rod is orthogonal to the longitudinal axis of the housing; and
an above-ground tracker configured to receive data from the downhole device;
the method comprising:
using the magnetic field sensor to make a first set of magnetic field measurements along a first axis and a second axis, the second axis orthogonal to the first axis, each axis corresponding to one of the ferrite rods;
rotating the drill string such that the housing is rotated by an increment;
after the rotational increment, using the magnetic field sensor to make a second set of magnetic field measurements along the first axis and the second axis; and
using the two sets of field measurements to calculate the magnetic field along a third axis, the third axis orthogonal to the first and second axes.

27. The method of claim 26 in which the housing is rotated about a longitudinal axis of the housing.

* * * * *

UNITED STATES PATENT AND TRADEMARK OFFICE
CERTIFICATE OF CORRECTION

| | |
|---|---|
| PATENT NO. | : 11,442,194 B2 |
| APPLICATION NO. | : 15/952905 |
| DATED | : September 13, 2022 |
| INVENTOR(S) | : Scott B. Cole |

It is certified that error appears in the above-identified patent and that said Letters Patent is hereby corrected as shown below:

In the Specification

Column 4, Line 63, please delete "in" and substitute therefor "111".

In the Claims

Column 7, Claim 16, Line 1, please delete "14" and substitute therefor "15".

Signed and Sealed this
Twenty-fifth Day of October, 2022

Katherine Kelly Vidal
*Director of the United States Patent and Trademark Office*